(12) United States Patent
Capodieci (10) Patent No.: US 6,655,948 B2
(45) Date of Patent: Dec. 2, 2003

(54) SYSTEM OF ULTRASONIC PROCESSING OF PRE-BAKED FOOD PRODUCT

(75) Inventor: Roberto A. Capodieci, Glen Ellyn, IL (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 09/944,608

(22) Filed: Aug. 31, 2001

(65) Prior Publication Data

US 2003/0041743 A1 Mar. 6, 2003

(51) Int. Cl.[7] .............................. A23P 1/00; B28B 17/00
(52) U.S. Cl. .................. 425/174.2; 99/451; 99/DIG. 12
(58) Field of Search .................... 425/174.2; 99/451, 99/353, DIG. 12

(56) References Cited

U.S. PATENT DOCUMENTS

| | | |
|---|---|---|
| D55,542 S | 6/1920 | Wipf |
| 2,145,941 A | 2/1939 | Maxfield |
| D117,043 S | 6/1939 | Huber |
| 3,029,751 A | 4/1962 | Gilmore |
| 3,031,804 A | 5/1962 | Thatcher et al. |
| 3,044,510 A | 7/1962 | Schneider et al. |
| 3,114,643 A | 12/1963 | Boston et al. |
| 3,199,437 A | 8/1965 | Nelsen |
| D212,542 S | 10/1968 | McCarthy |
| 3,407,077 A | 10/1968 | Helin |

(List continued on next page.)

FOREIGN PATENT DOCUMENTS

| | | |
|---|---|---|
| AT | 382 112 B | 1/1987 |
| AU | 733163 | 11/1998 |
| CA | 14902 | 1/1946 |
| CA | 41222 | 10/1976 |
| CA | 75746 | 2/1995 |

(List continued on next page.)

Primary Examiner—George C. Yeung
(74) Attorney, Agent, or Firm—McAndrews, Held & Malloy, Ltd.

(57) ABSTRACT

A system and method of ultrasonic processing of pre-baked food product and/or food product rework is provided that includes an ultrasonic horn and a forming member for receiving and forming unprocessed pre-baked food product into a desired shape. The ultrasonic horn is actuated to compress the unprocessed pre-baked food product between the ultrasonic horn and the forming member thereby forming compressed pre-baked food product. The ultrasonic horn ultrasonically energizes the compressed pre-baked food product to form an agglomerated food product. The system also includes an ejection member, such as an ejection piston, for ejecting the formed agglomerated food product away from the forming member. The forming member may be a forming cavity defined by a food product collection chamber. Alternatively, the forming member may include a forming block having a forming chamber. A fill plate having a fill recess may be positioned on the forming block to add more volume for the unprocessed pre-baked food product to accumulate. The ultrasonic horn may include a hemispherical protrusion or indentation; and the forming member may be a forming cylinder having a hemispherical protrusion or indentation that conforms to a contour of the hemispherical indentation or protrusion located on a compressive surface of the ultrasonic horn.

12 Claims, 3 Drawing Sheets

U.S. PATENT DOCUMENTS

| | | |
|---|---|---|
| 3,416,398 A | 12/1968 | Bodine |
| RE26,543 E | 3/1969 | Beeson et al. |
| 3,434,906 A | 3/1969 | De Greeve et al. |
| 3,505,136 A | 4/1970 | Attwood |
| 3,615,712 A | 10/1971 | Keller |
| 3,636,859 A | 1/1972 | Null |
| 3,819,089 A | 6/1974 | Scales |
| 3,829,007 A | 8/1974 | Ellison |
| 3,830,944 A | 8/1974 | Dimitriadis et al. |
| 3,873,735 A | 3/1975 | Chalin et al. |
| 3,895,118 A | 7/1975 | Rambold |
| 3,961,089 A | 6/1976 | Dogliotti |
| 3,971,838 A | 7/1976 | Yazawa |
| 4,017,237 A | 4/1977 | Webster |
| 4,055,109 A | 10/1977 | Kan |
| 4,097,327 A | 6/1978 | Calemard |
| 4,115,489 A | 9/1978 | Macfee |
| 4,163,768 A | 8/1979 | Stephens |
| D254,936 S | 5/1980 | Saunders |
| 4,216,639 A | 8/1980 | Gautier |
| 4,290,521 A | 9/1981 | Mitchell |
| 4,358,466 A | 11/1982 | Stevenson |
| 4,361,235 A | 11/1982 | Gautier |
| 4,373,982 A | 2/1983 | Kreager et al. |
| 4,394,395 A | 7/1983 | Rostagno et al. |
| 4,421,773 A | 12/1983 | Akutagawa |
| 4,453,370 A | 6/1984 | Titchenal |
| 4,500,280 A | 2/1985 | Astier et al. |
| 4,514,426 A | 4/1985 | Jordan et al. |
| 4,517,790 A | 5/1985 | Kreager |
| 4,521,467 A | 6/1985 | Berger |
| 4,534,726 A | 8/1985 | Simelunas |
| 4,534,818 A | 8/1985 | Kreager et al. |
| 4,574,566 A | 3/1986 | Eaves et al. |
| 4,601,157 A | 7/1986 | Adelman |
| 4,605,123 A | 8/1986 | Goodrum et al. |
| 4,608,261 A | 8/1986 | MacKenzie |
| 4,616,470 A | 10/1986 | Nakamura |
| 4,631,901 A | 12/1986 | Chung et al. |
| 4,651,870 A | 3/1987 | Giambalvo |
| 4,652,456 A | 3/1987 | Sailsbury |
| 4,663,915 A | 5/1987 | Van Erden et al. |
| 4,663,917 A | 5/1987 | Taylor et al. |
| 4,685,602 A | 8/1987 | Hama |
| 4,693,056 A | 9/1987 | Raszewski |
| 4,735,753 A | 4/1988 | Ackermann |
| D296,377 S | 6/1988 | Skiver et al. |
| 4,751,916 A | 6/1988 | Bory |
| 4,759,170 A | 7/1988 | Sawa et al. |
| 4,759,249 A | 7/1988 | Held |
| 4,774,797 A | 10/1988 | Colamussi et al. |
| 4,784,591 A | 11/1988 | Ackermann |
| 4,787,755 A | 11/1988 | Branson |
| 4,796,300 A | 1/1989 | Branson |
| 4,810,109 A | 3/1989 | Castel |
| 4,849,233 A | 7/1989 | Hemker |
| 4,864,802 A | 9/1989 | D'Angelo |
| 4,865,680 A | 9/1989 | Pierson |
| 4,879,124 A | 11/1989 | Oberle |
| 4,890,439 A | 1/1990 | Smart et al. |
| 4,909,870 A | 3/1990 | Gould et al. |
| 4,923,701 A | 5/1990 | VanErden |
| 4,937,410 A | 6/1990 | Anderson |
| 4,950,859 A | 8/1990 | Anderson |
| 4,972,995 A | 11/1990 | Schara et al. |
| 5,044,777 A | 9/1991 | Watkins et al. |
| 5,058,364 A | 10/1991 | Seiden et al. |
| 5,061,331 A | 10/1991 | Gute |
| 5,067,302 A | 11/1991 | Boeckmann |
| 5,104,674 A | 4/1992 | Chen et al. |
| 5,161,350 A | 11/1992 | Nakamura |
| 5,181,365 A | 1/1993 | Garvey et al. |
| 5,202,064 A | 4/1993 | Furusawa et al. |
| 5,222,813 A | 6/1993 | Kopp et al. |
| 5,226,343 A | 7/1993 | Rawson et al. |
| 5,228,372 A | 7/1993 | Harrop et al. |
| 5,230,761 A | 7/1993 | Crawford |
| 5,257,510 A | 11/1993 | Cox |
| 5,280,844 A | 1/1994 | Kaufman et al. |
| 5,342,634 A | 8/1994 | Murata et al. |
| 5,366,741 A | 11/1994 | Van Der Zon |
| 5,391,387 A | 2/1995 | Peters |
| 5,419,437 A | 5/1995 | Huseman |
| 5,435,712 A | 7/1995 | Probst |
| 5,437,215 A | 8/1995 | Hamilton |
| 5,519,982 A | 5/1996 | Herber et al. |
| 5,525,363 A | 6/1996 | Herber et al. |
| 5,552,165 A | 9/1996 | Haak et al. |
| 5,582,853 A | 12/1996 | Marnocha et al. |
| 5,645,681 A | 7/1997 | Gopalakrishna et al. |
| 5,667,824 A | 9/1997 | Ream et al. |
| 5,689,942 A | 11/1997 | Suga |
| 5,694,745 A | 12/1997 | Spatafora et al. |
| 5,706,635 A | 1/1998 | Simmons |
| 5,733,587 A | 3/1998 | Ream et al. |
| 5,752,423 A | 5/1998 | Rawson |
| 5,819,615 A | 10/1998 | Dale et al. |
| 5,827,559 A | 10/1998 | Powell |
| 5,846,584 A | 12/1998 | Capodieci |
| 5,861,185 A | 1/1999 | Capodieci |
| 5,863,585 A | 1/1999 | Sjöberg |
| 5,871,783 A | 2/1999 | Capodieci |
| 5,871,793 A | 2/1999 | Capodieci |
| 5,914,142 A | 6/1999 | Zartner |
| 5,928,695 A | 7/1999 | Capodieci |
| 6,032,561 A | 3/2000 | Lonn et al. |
| D422,774 S | 4/2000 | Hersh |
| 6,068,868 A | 5/2000 | Capodieci |
| 6,143,336 A | 11/2000 | Capodieci |
| 6,210,728 B1 | 4/2001 | Capodieci |
| 6,231,330 B1 | 5/2001 | Capodieci |
| 6,231,913 B1 | 5/2001 | Schwimer et al. |
| 6,318,248 B1 | 11/2001 | Capodieci |
| 6,357,914 B1 | 3/2002 | Kinigakis et al. |
| 6,361,609 B1 | 3/2002 | Ouellette et al. |
| 6,368,647 B1 | 4/2002 | Capodieci |
| 6,403,132 B1 | 6/2002 | Capodieci |
| 6,403,138 B1 | 6/2002 | Arora |
| 6,431,849 B1 | 8/2002 | Capodieci |
| 6,477,820 B1 | 11/2002 | Dutra et al. |
| 6,517,879 B2 | 2/2003 | Capodieci |
| 6,554,931 B1 | 4/2003 | Blanchard et al. |
| 6,574,944 B2 | 6/2003 | Capodieci |
| 2002/0119225 A1 | 8/2002 | Capodieci |
| 2003/0003207 A1 | 1/2003 | Capodieci |

FOREIGN PATENT DOCUMENTS

| | | |
|---|---|---|
| CA | 79905 | 2/1997 |
| DE | 29 22 834 A1 | 12/1980 |
| DE | 30 34 955 A1 | 3/1982 |
| DE | 88 09 048 | 10/1988 |
| DE | 40 17 363 A1 | 12/1991 |
| DE | 195 05 298 A1 | 8/1996 |
| DE | 197 16 141 A1 | 10/1997 |
| EP | 0 084 903 A2 | 8/1983 |
| EP | 0 333 390 A2 | 9/1989 |
| EP | 0 478 812 A1 | 4/1992 |
| EP | 0 584 670 | 3/1994 |
| EP | 0 499 647 B1 | 1/1995 |
| EP | 0 561 654 B1 | 1/1996 |
| FR | 2 665 683 A1 | 2/1992 |

| | | | | | |
|---|---|---|---|---|---|
| GB | 952 581 | 3/1964 | JP | 57-91164 | 6/1982 |
| GB | 1 013 665 | 12/1965 | JP | 63-315223 | 12/1988 |
| GB | 2 117 350 A | 10/1983 | JP | 03-158227 | 7/1991 |
| GB | 2 171 077 A | 8/1986 | WO | WO 98/48642 | 11/1998 |
| GB | 2 219 245 A | 12/1989 | WO | WO 99/33356 | 7/1999 |
| GB | 2 276 138 A | 9/1994 | WO | WO 00/20191 | 4/2000 |
| GB | 2 283 007 A | 4/1995 | WO | WO 03/020051 | 3/2003 |
| JP | 55-154119 | 12/1980 | | | |

SYSTEM OF ULTRASONIC PROCESSING OF PRE-BAKED FOOD PRODUCT

BACKGROUND OF THE INVENTION

The present invention generally relates to a system and method of processing pre-baked food product. In particular, the present invention relates to a system and method of ultrasonically processing pre-baked food product.

Typically, mass production of baked food products requires large expensive ovens to efficiently bake food product. Often, commercial baked food products are shaped such that other food products may be included within, or between the baked food product(s). For example, some candy bars include caramel sandwiched between two cookies. In order to shape the baked food product, the pre-baked food product may be shaped before it is put into an oven. The desired shape of the pre-baked food product is achieved, or set through the baking of the food product.

Some ovens may include molds that receive pre-baked food product, such as cookie dough. The molds typically ensure that the food product maintains a desired shape before and during the process of baking. A drawback to setting the shape of a food product through the baking process using a mold is that long process lines and large baking ovens may be required to produce a commercially sufficient number of the food product. That is, in order to produce enough baked food product to fill customer demand, long lines of molds and long, large baking ovens may be required. Such machinery may be complex, costly, and difficult to maintain.

Another drawback in the process of baking food product in a mold may be the inability to process baked food product rework. Food product rework is produced through the production of a food product. Food product rework may generally be defined as any excess food product produced but not ultimately utilized in the manufacture of a final food product. That is, food product rework is any extra or "left over" food product from a manufacturing cycle. Typically, in food product manufacturing systems that produce food product rework, the rework that is not or cannot be utilized, may be thrown out, discarded, or otherwise wasted. Thus, food product manufacturers have been searching for ways to utilize food product rework and reduce the ensuing waste of food product. For example, if some cookie products are broken, chipped, or deformed during the baking process, once they are baked and hardened, typically the cookie products may not be reworked. That is, once the cookie products have been baked once, they may not be re-shaped and re-baked again without burning the already hardened cookie product. Thus, the cookieproduct rework is typically unusable and must be discarded.

Another drawback that may be inherent in the process of baking food product, such as cookie dough, in a mold is that relatively long cycle times and precise temperatures may be required to sufficiently bake each cookie product. That is, the cookie products typically are baked at a precise temperature for relatively long cycle times. If the baking temperature is too low, the cookie product may require a longer time to completely bake, and if the temperature is too high, thus decreasing cooking time, the cookie products may burn. Thus, maintaining a precise temperature is typically required to ensure that the cookie products are properly baked. Maintaining such machinery may also be costly and difficult. Additionally, because baking may require relatively long cycle time, more cookie products may need to be baked at once to meet customer demand, which may potentially lead to problems associated with food product rework.

One reason food product manufacturers may be interested in utilizing food product rework is that the food product being used may be expensive to produce. That is, either the raw food product itself may be expensive or the process of making the food product may cause the food product to be expensive. Thus, in order to reduce costs, the food product manufacturer may want to utilize the maximum amount of food product and reduce the amount of food product rework that gets thrown out or discarded.

Another reason food product manufacturers may be interested in new and innovative ways to utilize food product rework is that some types of food products may not be particularly amenable to traditional food product rework techniques. That is, the characteristics of some types of food product rework may make the reuse and recycling of the food product rework difficult if not impossible using traditional rework techniques. Again, in an effort to reduce waste and cut costs, food product manufacturers may desire to utilize food product rework to their fullest capacity.

Typically, manufacturers of baked food products utilize baked wafer shaped food products. One of the greatest disadvantages to using a wafer-shaped food product is that the wafer typically has a distinctly different flavor and texture than baked, hollow-shell food products such as cookies or pretzels, for example. Often, the economics of mass production cause many manufacturers to compromise the taste and texture of manufacture baked food products. That is, in order to minimize costs, the wafer-shaped food product may be utilized even though a differently formed and shaped food product produces better texture and taste. Thus, wafer-shells may not be a commercially viable option for food product manufacturers desiring to produce a product with a cookie shell or pretzel shell flavor and texture, for example. Additionally, wafer rework may also not be reusable since it may also not be re-baked.

Thus, in response to the potential drawbacks of current baked food product manufacturing systems, a need exists for a system of efficiently forming pre-baked food products. Additionally, a need exists for a baked food product system that may rework traditionally unusable food product rework in an efficient and cost-effective manner.

SUMMARY OF THE INVENTION

In accordance with an embodiment of the present invention, a system and method for forming pre-baked food product and/or food product rework into an agglomerated food product has been developed that includes an ultrasonic horn and a forming member for receiving and forming unprocessed pre-baked food product and/or food product rework into a desired shape. The ultrasonic horn is actuated to compress the unprocessed food product between the ultrasonic horn and the forming member thereby forming compressed food product. The ultrasonic horn ultrasonically energizes the compressed food product to form an agglomerated food product. The system also includes an ejection member, such as an ejection piston, for ejecting the formed agglomerated food product away from the forming member.

The forming member may be a forming cavity defined by a food product collection chamber. Alternatively, the forming member may include a forming block having a forming chamber. A fill plate having a fill recess may be positioned on the forming block to add more volume for the unprocessed food product to accumulate. The fill recess aligns with an opening of the forming chamber. The ultrasonic horn may include a tip having a hemispherical protrusion. Alternatively, the ultrasonic horn may include a tip having an elongated elliptical protrusion. Also, alternatively, the forming member may be a forming cylinder having a hemispherical protrusion that conforms to a contour of a hemispherical forming cavity located on a compressive surface of the ultrasonic horn.

BRIEF DESCRIPTION OF THE DRAWINGS

The foregoing summary, as well as the following detailed description of the preferred embodiments of the present invention, will be better understood when read in conjunction with the appended drawings. For the purpose of illustrating the invention, there is shown in the drawings, embodiments that are present preferred. It should be understood, however, that the present invention is not limited to the precise arrangements and instrumentality shown in the attached drawings

DETAILED DESCRIPTION OF THE INVENTION

Figure 1A:
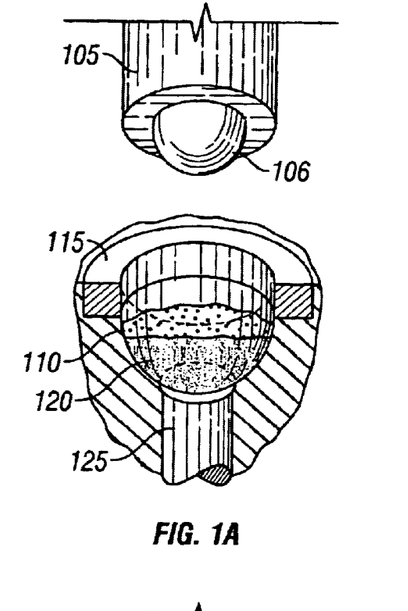
FIG. 1A is a perspective view showing an ultrasonic pre-baked food product system according to an embodiment of the present invention.
Figure 1B:
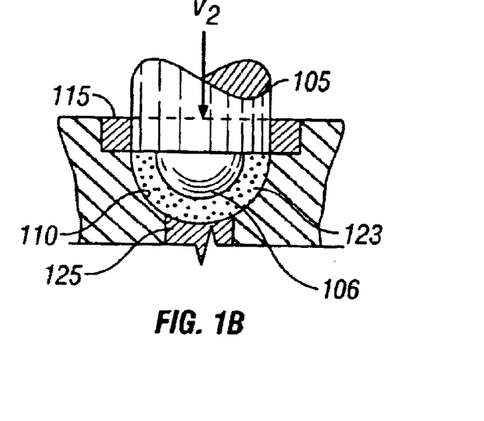
FIG. 1B is a side view showing an ultrasonic horn engaging the contents of a forming member according to an embodiment of the present invention.

FIGS. 1A–1D illustrate an ultrasonic pre-baked food product system 100 according to a preferred embodiment of the present invention. FIGS. 1A–1D illustrate the various stages of the system 100. FIG. 1A includes an ultrasonic horn 105, a forming cavity 110, a food product collection chamber 115, unprocessed pre-baked food product 120, and an ejection piston 125. FIG. 1B also includes the ultrasonic horn 105 having a hemispherical tip 106, the forming cavity 110, the food product collection chamber 115, compressed pre-baked food product 123, and the ejection piston 125.

Figure 1C:
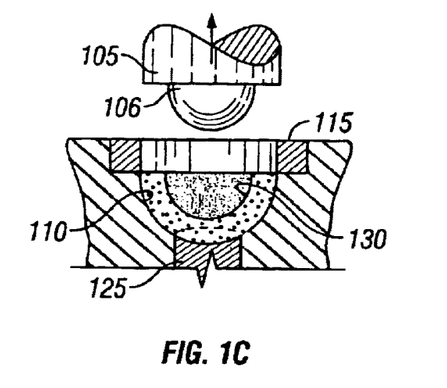
FIG. 1C is a side view showing a processed pre-baked food product agglomerated into a hardened hollow shell according to an embodiment of the present invention.
Figure 1D:
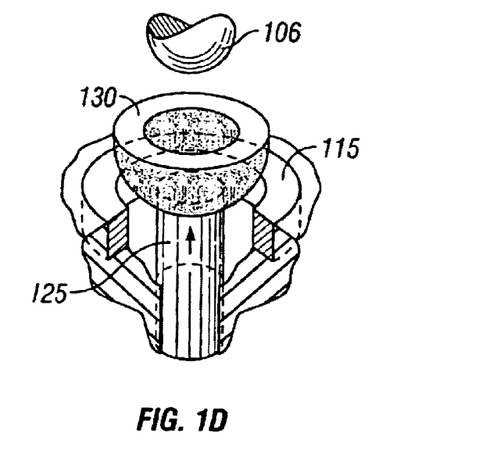
FIG. 1D is a perspective view showing the processed pre-baked food product ejecting from the forming member according to an embodiment of the present invention.

FIGS. 1C and 1D include the ultrasonic horn 105, the forming cavity 110, the food product collection chamber 115, ultrasonically processed pre-baked food product 130, and the ejection piston 125.

The ultrasonic horn 105 of the system 100 is preferably positioned directly above the food product collection chamber 115 and attached to a mechanical press (not shown). The lower tip of the ultrasonic horn 105 is preferably cylindrically shaped with a protruding hemispherical tip 106 extending from the center as illustrated in FIG. 1A. That is, the lower tip of the ultrasonic horn has a flat ring-shaped bottom edge with a hemispherical tip 106 protruding from the center of the ring.

Located beneath the ultrasonic horn 105 is the collection chamber 115. The collection chamber 115 is preferably attached to mounting hardware (not shown) and positioned above the forming cavity 110. The collection chamber 115 is preferably composed of a polyurethane material. The interior surface of the collection chamber 115 preferably extends around the upper perimeter of the forming cavity 110. The diameter of the collection chamber 115 is also preferably slightly wider than the diameter of the ultrasonic horn 105 and positioned such that the ultrasonic horn 105 may be lowered through the center of the collection chamber 115 without contacting the interior surface of the collection chamber 115.

The forming cavity 110 of the system 100 is preferably attached to the mounting hardware and is positioned so that the upper surface of the forming cavity 110 is aligned with the ultrasonic horn 105 as shown in FIG. 1A. The diameter of the forming cavity 110 is preferably substantially the same diameter as the ultrasonic horn 105. The interior surface of the forming cavity 110 may be coated with a layer of non-stick material such as, for example, Teflon. However, the interior surface of the forming cavity 110 may not be coated with a layer of non-stick material depending on the adhesive qualities of the pre-baked food product and the desired texture of the resulting food product. The center of the base of the forming cavity 110 preferably contains an opening where the ejection piston 125 is located as illustrated in FIG. 1A.

The ejection piston 125 is preferably positioned beneath the base of the forming cavity 110 so that the upper surface of the ejection piston 125 fits in a substantially flush alignment with the opening at the base of the forming cavity 110. That is, the top surface of the ejection piston 125 is preferably flush with the bottom of the forming cavity 110. The top surface of the ejection piston 125 may also be coated with a same non-stick material. The ejection piston 125 is attached to an ejection system (not shown).

In operation, the unprocessed pre-baked food product 120, preferably pre-baked cookie pellets, is introduced into the forming cavity 110 as illustrated in FIG. 1A. The unprocessed food product rework 120 is poured or deposited into the forming cavity 110 from above the collection chamber 115, such as by a conveyor (not shown). The unprocessed food product rework 120 is preferably introduced as in pellet form, however a powder of pre-baked food product may also be used. The use of pre-baked food product pellets provides a faster and easier method of feeding the pre-baked food product into the forming cavity, as opposed to powdered pre-baked food product. The volume of unprocessed pre-baked food product 120 introduced typically exceeds the volume of the forming cavity 110. The volume of unprocessed pre-baked food product 120 exceeding the volume of the forming cavity 110 is held in position by the forming chamber 115.

After the unprocessed pre-baked food product 120 is introduced into the forming cavity 110, the ultrasonic horn 105 is lowered through the collection chamber 115 by the mechanical press. The ultrasonic horn 105 is ultrasonically activated by methods known in the art, or as described in U.S. Pat. No. 5,871,783 issued to Roberto Capodieci, which is herein incorporated by reference in its entirety. The ultrasonic horn 105 preferably passes through the collection chamber 115 and into the forming cavity 110 as illustrated in FIG. 1B. As the ultrasonic horn 105 is lowered into the forming cavity 110, the unprocessed pre-baked food product 120 is compressed by the lower surface of the ultrasonic horn 105 into the forming cavity 110. The ultrasonic horn 105 is lowered to a position such that the unprocessed pre-baked food product 120 is compressed to a desired density forming the compressed pre-baked food product 123. As the compressed pre-baked food product 123 is being compressed by the ultrasonic horn 105, ultrasonic energy is imparted into the unprocessed pre-baked food product 120 by the ultrasonic horn 105. The injection of ultrasonic energy into the compressed pre-baked food product 123 causes the compressed pre-baked food product rework 123 to agglomerate into ultrasonically processed pre-baked food product 130.

The ultrasonically processed pre-baked food product 130 agglomerates into a hardened hollow shell, of desired texture, in the shape of the forming cavity 110 as illustrated in FIG. 1C. Once the ultrasonically processed pre-baked food product 130 has been agglomerated to a desired hardness, the ultrasonic horn 105 is lifted from the forming cavity 110 and the collection chamber 115.

The force of compression, the amplitude of vibration of the ultrasonic horn 105 and the time that ultrasonic energy is imparted to the pre-baked food product determine the hardness, texture and consistency of the processed pre-baked food product 130. For example, if a processed pre-baked food product 130 of extreme hardness is desired, the unprocessed food product 120 is highly compressed, and a rapid and intense ultrasonic vibration is applied to the highly compressed food product. On the other hand, if a processed food product 130 of softer texture and quality is desired, the applied force of compression is decreased and the intensity of the ultrasonic energy imparted to the food product is decreased.

Finally, as illustrated in FIG. 1D, the ejection piston 125 is elevated into the forming cavity 110 by the ejection system (not shown). The ejection piston 125 may be raised by a mechanical, pneumatic, hydraulic, or other system. The elevation of the ejection piston 125 ejects the ultrasonically processed pre-baked food product 130 out of the forming cavity 110 and the ultrasonically processed pre-baked food product 130 may then be sent to another downstream process (not shown) such as packaging, filling, or inspection, for example.

Alternatively, food product rework may be agglomerated. That is, instead of, or in addition to, agglomerating pre-baked food product, food product rework may be agglomerated by the system 100.

Figure 2A:
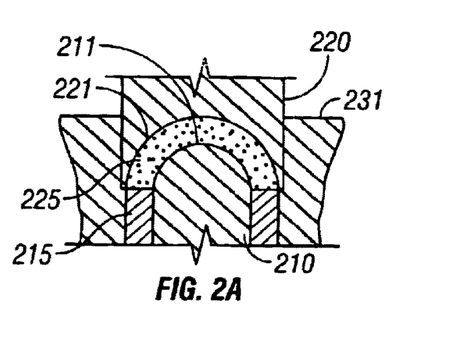
FIG. 2A is a side view showing an ultrasonic horn engaging the contents of a forming member according to an embodiment of the present invention.
Figure 2B:
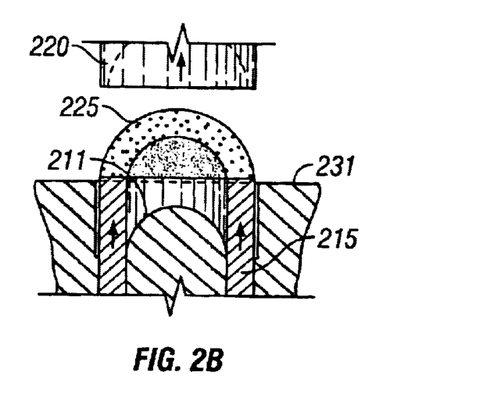
FIG. 2B is a side view showing a processed pre-baked food product agglomerated into a hardened hollow shell according to an embodiment of the present invention.

FIGS. 2A and 2B illustrate an inverted ultrasonic pre-baked food product system 200 according to an alternative embodiment of the present invention. FIGS. 2A and 2B illustrate the various stages of the system 200. FIG. 2A includes a forming chamber 210 having a hemispherical protrusion 211, an ejection tube 215, an ultrasonic forming horn 220 having a hemispherical forming cavity 221, and compressed pre-baked food product 225. FIG. 2B also includes the forming chamber 210, the ejection tube 215, the ultrasonic forming horn 220, and ultrasonically processed pre-baked food product 225. FIGS. 2A and 2B also include a conveyor line 231 that conveys unprocessed pre-baked food product into the food product collection area, that is, the area between the ultrasonic horn 220 and the forming cylinder 215. Also, the conveyor line 231 conveys processed food product away from the food product collection area.

The ultrasonic forming horn 220 of the system 200 is preferably positioned directly above the forming chamber 210 and attached to a mechanical press (not shown). The lower surface of the ultrasonic horn 220 is preferably formed with a hemispherical forming cavity 221 extending into the ultrasonic horn 220.

Similar to the system of FIGS. 1A–1D, located beneath the ultrasonic horn 220 is the forming chamber 210. The forming chamber 210 is preferably attached to mounting hardware (not shown). The upper tip of the forming chamber 210 is preferably a hemispherical protrusion 211 that conforms to the contour of the hemispherical forming cavity 221 of the ultrasonic horn 220.

The forming chamber 210 of the system 200 is preferably attached to the mounting hardware and is positioned so that the upper surface of the forming chamber 210 is aligned with the ultrasonic horn 220. The diameter of the forming chamber 210 is preferably substantially the same diameter as the hemispherical forming cavity 221 of the ultrasonic horn 220. The surface of the hemispherical protrusion 211 of the forming chamber 210 may be coated with a layer of non-stick material such as, for example, Teflon.

The ejection tube 215 surrounds the forming chamber 210 and substantially conforms to the shaft circumference of the forming chamber 210. The top surface of the ejection tube 215 may also be coated with the same non-stick material as the surface of the forming chamber 210. The ejection tube 215 is attached to an ejection system (not shown).

In operation, unprocessed pre-baked food product, preferably pre-baked cookie pellets, is introduced into a forming space, or food product collection area, between the ultrasonic horn 220 and the forming chamber 210 such that the unprocessed pre-baked food product is supported by the forming chamber 210 and the ejection tube 215. For example, the conveyor line 231 may drop unprocessed pre-baked food product onto the forming chamber 210 and the ejection tube 215. The unprocessed pre-baked food product is preferably poured into the forming space from above the forming chamber 210 by the conveyor line 231. As mentioned with respect to FIGS. 1A–1D, the unprocessed food product rework is preferably introduced in pellet form, however, a powdered pre-baked food product may also be used.

After the unprocessed pre-baked food product is introduced into the forming space, the ultrasonic horn 220 is lowered onto the forming chamber 210 by the mechanical press. The ultrasonic horn 220 is then ultrasonically activated and encounters the unprocessed pre-baked food product. As the ultrasonic horn 220 is lowered onto the unprocessed pre-baked food product, the unprocessed pre-baked food product is compressed between the lower surface of the ultrasonic horn 220 and the upper surface of the forming chamber 210, as shown in FIG. 2A. The ultrasonic horn 220 is lowered to a position such that the unprocessed pre-baked food product 120 is compressed to a desired density forming compressed pre-baked food product 225. As the compressed pre-baked food product 225 is compressed by the ultrasonic horn 220, ultrasonic energy is imparted into the unprocessed pre-baked food product by the ultrasonic horn 220. The injection of ultrasonic energy into the compressed pre-baked food product causes the compressed pre-baked food product to agglomerate into ultrasonically processed pre-baked food product 225.

As mentioned above, the force of compression, the amplitude of vibration of the ultrasonic horn 220 and the time that ultrasonic energy is imparted to the pre-baked food product determine the hardness, texture and consistency of the processed pre-baked food product. For example, if a processed pre-baked food product of extreme hardness is desired, the unprocessed food product is highly compressed, and a rapid and intense ultrasonic vibration is applied to the highly compressed food product. On the other hand, if a processed food product of softer texture and quality is desired, the applied force of compression is decreased and the intensity of the ultrasonic energy imparted to the food product is decreased.

The ultrasonically processed pre-baked food product 225 agglomerates into a hardened hollow shell in the shape of the hemispherical forming cavity 221 of the ultrasonic horn 220 and the hemispherical protrusion 211 of the forming chamber 210. Once the ultrasonically processed pre-baked food product 225 has been agglomerated to a desired hardness having a desired texture, the ultrasonic horn 220 is lifted from the forming chamber 210 and the ejection tube 215. Finally, as illustrated at Step 200B, the ejection tube 215 is elevated into the forming space by the ejection system (not shown). The processed pre-baked food product 225 is supported at its lower circumferential edge by the ejection tube 215. The ejection tube 215 may be raised by a mechanical, pneumatic, hydraulic, or some other system. The elevation of the ejection tube 215 ejects the ultrasonically processed pre-baked food product 225 away from the forming chamber 210 and the ultrasonically processed pre-baked food product 225 may then be sent to another downstream process (not shown) such as packaging, filling, or inspection, for example.

Alternatively, food product rework may be agglomerated. That is, instead of, or in addition to, agglomerating pre-baked food product, food product rework may be agglomerated by the system 200.

FIGS. 3A–3D illustrate an ultrasonic pre-baked food product system 300 according to an alternative embodiment of the present invention. FIGS. 3A–3D include a forming block 301, a fill plate 306 and an ultrasonic horn 310. The forming block 301 includes a food product forming chamber 302 and an ejection member 304. The fill plate 306 includes a fill recess 308.

The ultrasonic horn 310 of the system 300 is preferably positioned directly above the food product forming chamber 302 and attached to a mechanical press (not shown). The lower tip of the ultrasonic horn 310 includes an elongated elliptical, or canoe-shaped protruding tip 311 that conforms to the canoe shape of the forming chamber 302.

The fill plate 306 and the forming chamber 302 are located beneath the ultrasonic horn 310. The fill plate 306 is placed on top of the forming chamber 302 such that the fill recess 306 aligns with the forming chamber 302. For example, a corner of the fill plate 306 may be fastened to a corresponding corner of the forming block 301 such that the fill plate 306 may swivel, or rotate into position over the forming block. The fill plate 306 is placed on top of the forming chamber to provide more volume for food product to be positioned. The forming block 301 is preferably attached to mounting hardware (not shown). The cross-sectional area of the fill recess 308 is slightly greater than the cross-sectional area of the tip 311 of the ultrasonic horn 310 and positioned such that the ultrasonic horn 310 may be lowered through the fill recess 308, into the forming chamber 302 without contacting the interior surface of the fill chamber 302 or the interior side walls that bound the fill recess 308.

The fill recess 308 and the forming chamber 302 of the system 300 are positioned so that the fill recess 308 and the forming chamber 302 are aligned with the ultrasonic horn 310. The interior surface of the forming chamber 302 and the interior side walls bounding the fill recess 308 may be coated with a layer of non-stick material such as, for example, Teflon. The center of the base of the forming chamber 302 preferably contains an opening where the ejection member 304 is located.

The ejection member 304 is preferably positioned beneath the base of the forming chamber 302 so that the upper surface of the ejection member 304 fits in a substantially flush alignment with the opening at the base of the forming chamber 302. That is, the top surface of the ejection member 304 is preferably flush with the bottom of the forming chamber 302. The top surface of the ejection member 304 may also be coated with a same non-stick material. The ejection member 304 is preferably attached to an ejection system (not shown).

In operation, unprocessed pre-baked food product, preferably pre-baked cookie pellets, is introduced into the forming chamber 302 and fill recess 308. The unprocessed pre-baked food product is preferably poured into the forming chamber 302 and fill recess 308 from above the forming block 301, such as by a conveyor (not shown). The unprocessed pre-baked food product is preferably introduced in pellet form, however it may also be introduced in powdered form. The volume of unprocessed pre-baked food product introduced typically exceeds the volume of the forming chamber 302. The volume of unprocessed pre-baked food product exceeding the volume of the forming chamber 302 is held in position by the fill recess 308.

Figure 3A:
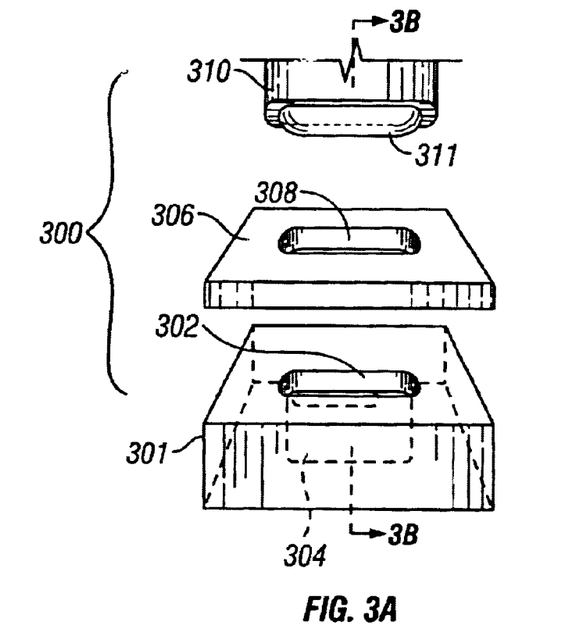
FIG. 3A is a perspective view showing an ultrasonic pre-baked food product system according to an embodiment of the present invention.
Figure 3B:
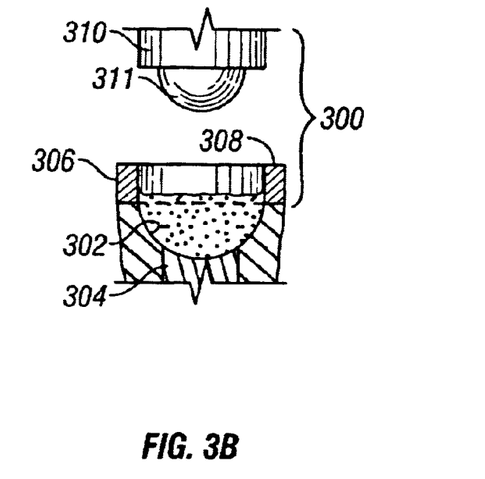
FIG. 3B is a side view of the system in FIG. 3A showing an ultrasonic pre-baked food product system according to an embodiment of the present invention.
Figure 3C:
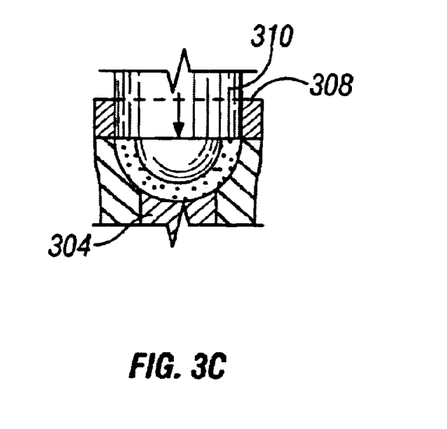
FIG. 3C is a side view showing an ultrasonic horn engaging the contents of a forming member according to an embodiment of the present invention.

After the unprocessed pre-baked food product is introduced into the forming chamber 302 and the fill recess 308, the ultrasonic horn 310 is lowered through the fill recess 308 and the forming chamber 302 by the mechanical press. The ultrasonic horn 310 is ultrasonically activated and preferably passes through the fill recess 308 and into the forming chamber 302. As the ultrasonic horn 310 is lowered into the forming chamber 302, the unprocessed pre-baked food product is compressed by the lower surface of the ultrasonic horn 310 into the forming chamber 302. The ultrasonic horn 310 is lowered to a position such that the unprocessed pre-baked food product is compressed to a desired density forming compressed pre-baked food product. As the compressed pre-baked food product is compressed by the ultrasonic horn 310, ultrasonic energy is imparted into the unprocessed pre-baked food product by the ultrasonic horn 310. The injection of ultrasonic energy into the compressed pre-baked food product causes the compressed pre-baked food product to agglomerate into ultrasonically processed pre-baked food product.

As mentioned above, the force of compression, the amplitude of vibration of the ultrasonic horn 310 and the time that ultrasonic energy is imparted to the pre-baked food product determine the hardness, texture and consistency of the processed pre-baked food product. For example, if a processed pre-baked food product of extreme hardness is desired, the unprocessed food product is highly compressed, and a rapid and intense ultrasonic vibration is applied to the highly compressed food product. On the other hand, if a processed food product of softer texture and quality is desired, the applied force of compression is decreased and the intensity of the ultrasonic energy imparted to the food product is decreased.

Figure 3D:
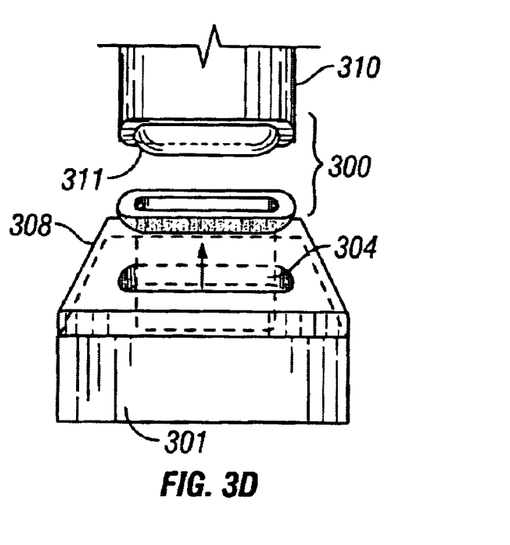
FIG. 3D is a perspective view showing the processed pre-baked food product ejecting from the forming member according to an embodiment of the present invention.

The ultrasonically processed pre-baked food product agglomerates into a hollow shell having a desired hardness in the canoe shape of the forming chamber 302. Once the ultrasonically processed pre-baked food product has been agglomerated to a desired hardness having a desired texture, the ultrasonic horn 310 is lifted from the forming chamber 302 and the fill recess 308. Finally, the ejection member 304 is elevated into the forming chamber 302 by the ejection system (not shown). The ejection member 304 may be raised by a mechanical, pneumatic, hydraulic, or other system. The elevation of the ejection member 304 ejects the ultrasonically processed pre-baked food product out of the forming chamber 302 and the fill recess 308 and the ultrasonically processed pre-baked food product may then be sent to another downstream process (not shown) such as packaging, filling, or inspection, for example.

Alternatively, food product rework may be agglomerated. That is, instead of, or in addition to, agglomerating pre-baked food product, food product rework may be agglomerated by the system 200.

Also, alternatively, with respect to FIGS. 1A–1D, 2A, 2B, and 3A–3D, the forming cavity may be include a shaped, embossed or engraved figure, monogram or logo. The figure, monogram or logo is then formed onto the surface of the processed pre-baked food product when the food product is agglomerated through ultrasonic energy.

Also, alternatively, the food product rework may be formed into a solid food product. That is, the agglomerated food product does not necessarily need to have a hollow center. The ultrasonic horn, or the forming member, may have a flat compressive surface, instead of a protruding surface, thereby allowing a solid piece of food product material to be produced. For example, a flat cookie, or other biscuit may be formed. Also, a pre-baked food product of various shapes may be formed. The pre-baked food product shapes may then be used in later processes. For example, flat pre-baked silhouette bases may be formed for use with other products.

Figure 4:
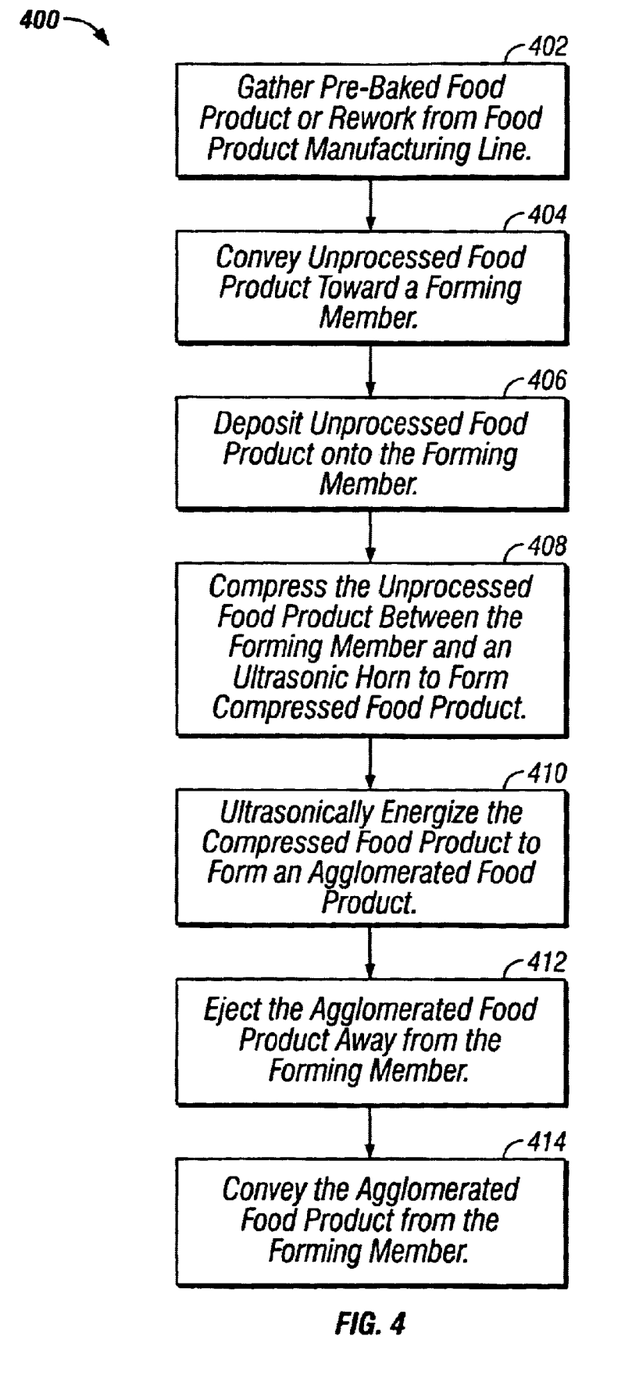
FIG. 4 illustrates a flow chart showing a method of forming pre-baked food product into an agglomerated pre-baked food product.

Also alternatively, instead of an ejection system, the processed pre-baked food product may be dislodged from the system by inverting the forming chamber. Depending on the adhesive quality of the processed pre-baked food product, the weight of the food product may suffice to dislodge the food product from the inverted chamber. Alternatively, the ultrasonic horn may contact the outer surface of the forming chamber and impart ultrasonic energy to the forming chamber thereby providing the force needed to dislodge the pre-baked food product from the forming chamber FIG. 4 illustrates a flow chart 400 showing a method of forming unprocessed pre-baked food product into an agglomerated food product. At step 402, pre-baked food product is gathered from a food product manufacturing line. At step 404, the gathered, unprocessed pre-baked food product is conveyed, for example through a conveyor belt, toward a forming member. Next, at step 406, the unprocessed pre-baked food product is deposited onto the forming member. At step 408, an ultrasonic horn is actuated to compress the unprocessed pre-baked food product between the forming member and the ultrasonic horn to form compressed pre-baked food product. Next, at step 410, the ultrasonic horn ultrasonically energizes the compressed pre-baked food product to form an agglomerated food product. At step 412, the agglomerated food product is ejected from the forming member. Finally, at step 414, the agglomerated food product is conveyed from the forming member.

Thus, the embodiments of the present invention provide a pre-baked food product system capable of agglomerating pre-baked food product, such as pre-baked cookie pellets or powder. The present invention also provides a system and method of agglomerating baked food product rework. Additionally, embodiments of the present invention provide an efficient and cost-effective pre-baked food product forming system.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. A system for forming pre-baked food product into an agglomerated food product, said system comprising:

a forming member for receiving pre-baked food product;

an ultrasonic horn, said ultrasonic horn actuating to compress said pre-baked food product between said ultrasonic horn and said forming member to form an agglomerated food product; and an ejection member for ejecting said formed agglomerated food product away from said forming member.

2. A system for forming pre-baked food product into an agglomerated food product, said system comprising:

a forming member for receiving pre-baked food product;

an ultrasonic horn, said ultrasonic horn actuating to compress said pre-baked food product between said ultrasonic horn and said forming member to form an agglomerated food product; and an ejection member for ejecting said formed agglomerated food product away from said forming member;

wherein said ejection member is an ejection piston.

3. A system for forming pre-baked food product into an agglomerated food product, said system comprising:

a forming member for receiving pre-baked food product; and an ultrasonic horn, said ultrasonic horn actuating to compress said pre-baked food product between said ultrasonic horn and said forming member to form an agglomerated food product;

wherein said forming member is a forming cylinder having a hemispherical protrusion that conforms to a contour of a hemispherical forming cavity located on a compressive surface of said ultrasonic horn.

4. A system for forming pre-baked food product into an agglomerated food product said system comprising:

a forming member for receiving pre-baked food product; and an ultrasonic horn, said ultrasonic horn actuating to compress said pre-baked food product between said ultrasonic horn and said forming member to form an agglomerated food product;

wherein said forming member includes a forming chamber formed within a forming block;

wherein said forming member includes a fill plate having a fill recess, and wherein said fill plate is positioned on said forming block such that said fill recess is aligned with an opening of said forming chamber.

5. A system for forming food product rework into an agglomerated food product, said system comprising:

a forming member for receiving food product rework;

an ultrasonic horn, said ultrasonic horn actuating to compress said food product rework between said ultrasonic horn and said forming member to form an agglomerated food product; and an ejection member for ejecting said formed agglomerated food product away from said forming member.

6. A system for forming food product rework into an agglomerated food product, said system comprising:

a forming member for receiving food product rework;

an ultrasonic horn, said ultrasonic horn actuating to compress said food product rework between said ultrasonic horn and said forming member to form an agglomerated food product; and an ejection member for ejecting said formed agglomerated food product away from said forming member, wherein said ejection member is an ejection piston.

7. A system for forming food product rework into an agglomerated food product, said system comprising:

a forming member for receiving food product rework; and an ultrasonic horn, said ultrasonic horn actuating to compress said food product rework between said ultrasonic horn and said forming member to form an agglomerated food product;

wherein said forming member is a forming cylinder having a hemispherical protrusion that conforms to a contour of a hemispherical forming cavity located on a compressive surface of said ultrasonic horn.

8. A system for forming food product rework into an agglomerated food product, said system comprising:

a forming member for receiving food product rework; and an ultrasonic horn, said ultrasonic horn actuating to compress said food product rework between said ultrasonic horn and said forming member to form an agglomerated food product;

wherein said forming member includes a forming chamber formed within a forming block;

wherein said forming member includes a fill plate having a fill recess, and wherein said fill plate is positioned on said forming block such that said fill recess is aligned with an opening of said forming chamber.

9. The system of claim 1 wherein said forming member includes an opening for said ejection member.

10. The system of claim 5 wherein said forming member includes an opening for said ejection member.

11. A system for ultrasonic product forming, said system comprising:

a forming member receiving material to be formed into a product, said forming member having a curvilinear forming member product contact surface; and an ultrasonic horn having a curvilinear horn product contact surface, said ultrasonic horn actuating to compress material between said ultrasonic horn and said forming member into a product, wherein said curvilinear forming member product contact surface and curvilinear horn product contact surface conform to each other over a curvilinear shape.

12. A system for ultrasonic product forming, said system comprising:

a forming member receiving material to be formed into a product, said forming member having a forming member product contact surface; and an ultrasonic horn having a horn product contact surface, said ultrasonic horn actuating to compress material between said ultrasonic horn and said forming member into a product, wherein at least one of said forming member product contact surface and horn product contact surface include a convex hollow-forming structure.

* * * * *